(12) United States Patent
Emoto et al.

(10) Patent No.: US 7,835,861 B2
(45) Date of Patent: Nov. 16, 2010

(54) NAVIGATION APPARATUSES, METHODS, AND PROGRAMS FOR GENERATION OF A 3D MOVIE

(75) Inventors: Michiko Emoto, Anjo (JP); Shinya Miyamoto, Sapporo (JP); Kazuyoshi Yamamoto, Sapporo (JP)

(73) Assignee: Aisin AW Co., Ltd., Anjo (JP)

( * ) Notice: Subject to any disclaimer, the term of this patent is extended or adjusted under 35 U.S.C. 154(b) by 711 days.

(21) Appl. No.: 11/812,923

(22) Filed: Jun. 22, 2007

(65) Prior Publication Data
US 2008/0040035 A1 Feb. 14, 2008

(30) Foreign Application Priority Data
Jun. 30, 2006 (JP) .............................. 2006-182794

(51) Int. Cl.
*G01C 21/32* (2006.01)
(52) U.S. Cl. ................................. 701/211; 340/995.17
(58) Field of Classification Search .................. 701/211
See application file for complete search history.

(56) References Cited

U.S. PATENT DOCUMENTS

| | | | |
|---|---|---|---|
| 5,613,055 A * | 3/1997 | Shimoura et al. ............ 345/473 |
| 5,838,262 A * | 11/1998 | Kershner et al. ............ 340/945 |
| 6,311,126 B1 | 10/2001 | Katayama et al. | |
| 6,944,537 B2 * | 9/2005 | Wiio et al. .................. 701/209 |
| 6,970,786 B2 | 11/2005 | Hayama et al. | |
| 2005/0234638 A1 * | 10/2005 | Ogaki et al. ................. 701/209 |
| 2008/0162043 A1 * | 7/2008 | Emoto et al. ................. 701/211 |

FOREIGN PATENT DOCUMENTS

| | | | |
|---|---|---|---|
| EP | 0 579 451 A1 | | 1/1994 |
| EP | 579451 A1 * | | 1/1994 |
| EP | 1 085 299 A2 | | 3/2001 |
| EP | 1 584 897 A2 | | 10/2005 |
| EP | 1584897 A2 * | | 10/2005 |
| JP | A-08-219800 | | 8/1996 |
| JP | A 10-115529 | | 6/1998 |
| JP | 2003195744 A * | | 7/2003 |
| JP | A-2003-195743 | | 7/2003 |
| JP | A-2003-195744 | | 7/2003 |

OTHER PUBLICATIONS

Oct. 30, 2007 European Search Report issued in EP 07 11 0887 w/English-translation.

(Continued)

*Primary Examiner*—Thomas G Black
*Assistant Examiner*—Shelley Chen
(74) *Attorney, Agent, or Firm*—Oliff & Berridge, PLC

(57) ABSTRACT

Navigation apparatuses, methods, and programs set a reference point on a route, set at least one point on the route on the basis of the reference point, and set a region along the route, the region being set on the basis of the set at least one point and the region including the at least one point. The navigation apparatuses, methods, and programs obtain 3D map data corresponding to the region, generate a 3D movie which has a predetermined viewpoint on the basis of the obtained 3D map data, and display the generated 3D movie.

15 Claims, 11 Drawing Sheets

OTHER PUBLICATIONS

Office Action mailed Dec. 6, 2009 in European Patent Application No. 07 110 887.2.
Office Action mailed Apr. 27, 2010 in European Patent Application No. 07 110 887.2.
Office Action mailed May 2, 3008 in Japanese Patent Application No. 2006-182794.
Office Action mailed Jan. 8, 2009 in Japanese Patent Application No. 2006-182794.

* cited by examiner

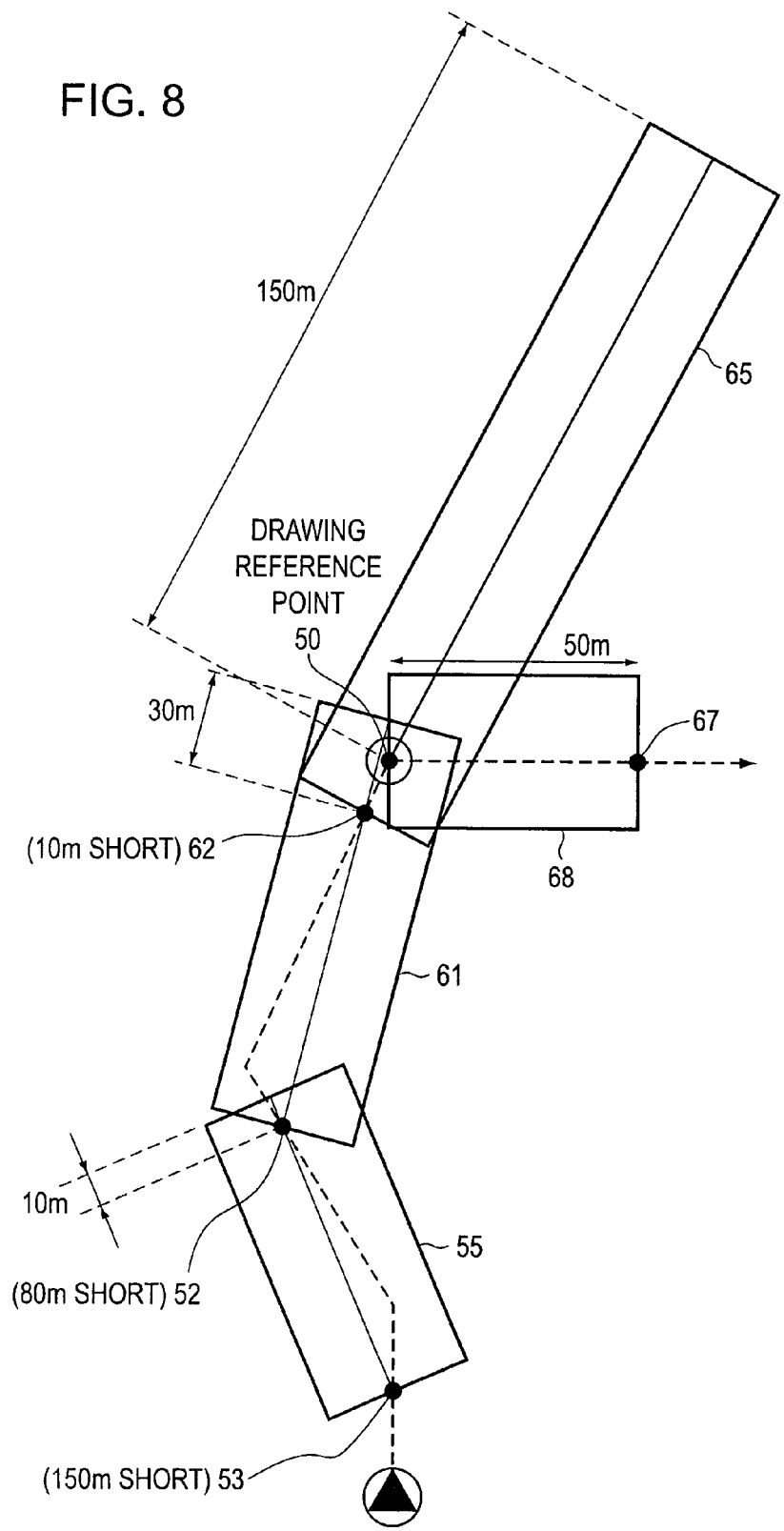

NAVIGATION APPARATUSES, METHODS, AND PROGRAMS FOR GENERATION OF A 3D MOVIE

INCORPORATION BY REFERENCE

The disclosure of Japanese Patent Application No. 2006-182794, filed on Jun. 30, 2006, including the specification, drawings and abstract thereof, is incorporated herein by reference in its entirety.

BACKGROUND

1. Related Technical Fields

Related technical fields include navigation apparatuses, and more particularly, a navigation apparatuses providing a moving 3D image on a route guidance screen.

2. Description of the Related Art

In recent years, navigation apparatuses for aiding in the navigation of vehicles have become very popular. Such a navigation apparatus searches for a route from a starting point to a destination, detects a current position of a vehicle by means of a GPS (Global Positioning System) and/or a gyro, and displays the route to the destination and the current position of the vehicle. It is important for such a navigation apparatus to provide an understandable display to a driver of the vehicle. For example, a navigation apparatus for a vehicle disclosed in Japanese Unexamined Patent Application Publication No. 10-115529 provides a 3D (3D) movie which is presented from the viewpoint of a driver.

The navigation apparatus disclosed in Japanese Unexamined Patent Application Publication No. 10-115529 provides guidance regarding an intersection by drawing a route on a 3D map in which structures, such as buildings, are displayed. When a two-dimensional map is used, the driver needs to figure out how the two-dimensional map corresponds to the real view. However, the navigation apparatus with the structure disclosed in Japanese Unexamined Patent Application Publication No. 10-115529 displays a 3D movie, so that it is easier for the driver to compare the map with the real view.

As shown in FIG. 12, to generate the 3D movie, the navigation apparatus measures off 3D map data 102 in rectangular regions (each rectangular region is denoted by reference numeral 100 and all of the rectangular regions include a route 101). The navigation apparatus selects one of the rectangular regions 100 corresponding to the current position of the vehicle, reads data of the rectangular region 100 stored in a memory, and generates the 3D movie on the basis of the read data.

SUMMARY

However, the volume of the 3D map data is so large that a considerable amount of the memory of the navigation apparatus is required to store the data when the navigation apparatus reads the 3D map data on a region-by-region basis. The amount of memory installed in the navigation apparatus is limited. However, the navigation apparatus mounted in the vehicle is required to provide a movie that is updated in real time along with the motion of the vehicle.

Accordingly, various exemplary implementations of the broad principles described herein provide a navigation apparatus for providing route guidance by means of a 3D movie while requiring use of a smaller amount of memory.

Various exemplary implementations provide navigation apparatuses, methods, and programs that may set a reference point on a route, may set at least one point on the route on the basis of the reference point, and may set a region along the route, the region being set on the basis of the set at least one point and the region including the at least one point. The navigation apparatuses, methods, and programs may obtain 3D map data corresponding to the region, may generate a 3D movie which has a predetermined viewpoint on the basis of the obtained 3D map data, and may display the generated 3D movie.

BRIEF DESCRIPTION OF THE DRAWINGS

Exemplary implementations will now be described with reference to the accompanying drawings, wherein:

FIG. 8 is a diagram illustrating an example of regions for which data is to be read;

DETAILED DESCRIPTION OF EXEMPLARY IMPLEMENTATIONS

Figure 1:
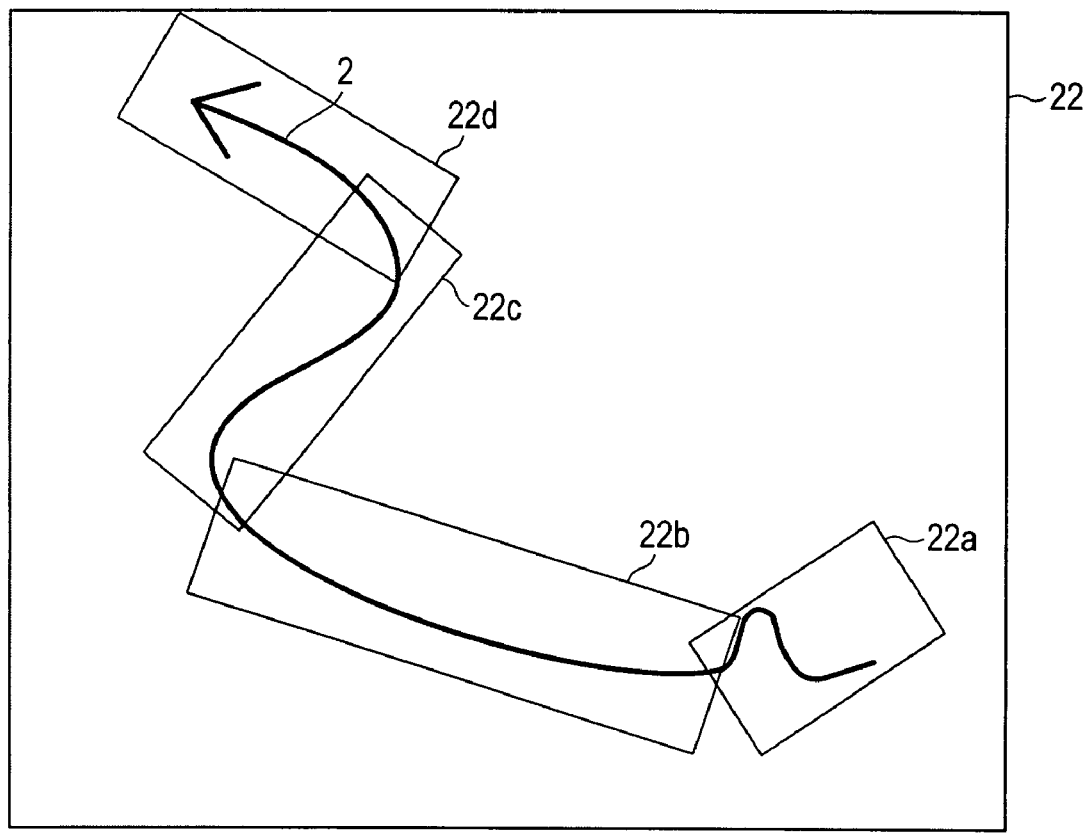
FIG. 1 is a diagram illustrating an exemplary data management method.

FIG. 1 shows an exemplary method for managing route data. As shown in FIG. 1, rectangular regions 22a through 22d along a route 2 for which data is to be read may be set in accordance with the shape of route 2. Each of the rectangular regions may be set as having a centerline, which passes through two points set on the route 2. The navigation apparatus 1 may read 3D map data 22 included in the regions 22a through 22d and may draw the map, so that it may be possible for the navigation apparatus 1 to draw the 3D movie. In this case, the memory usage may be reduced compared to the known way of setting rectangular regions for which data is to be read.

Figure 2:
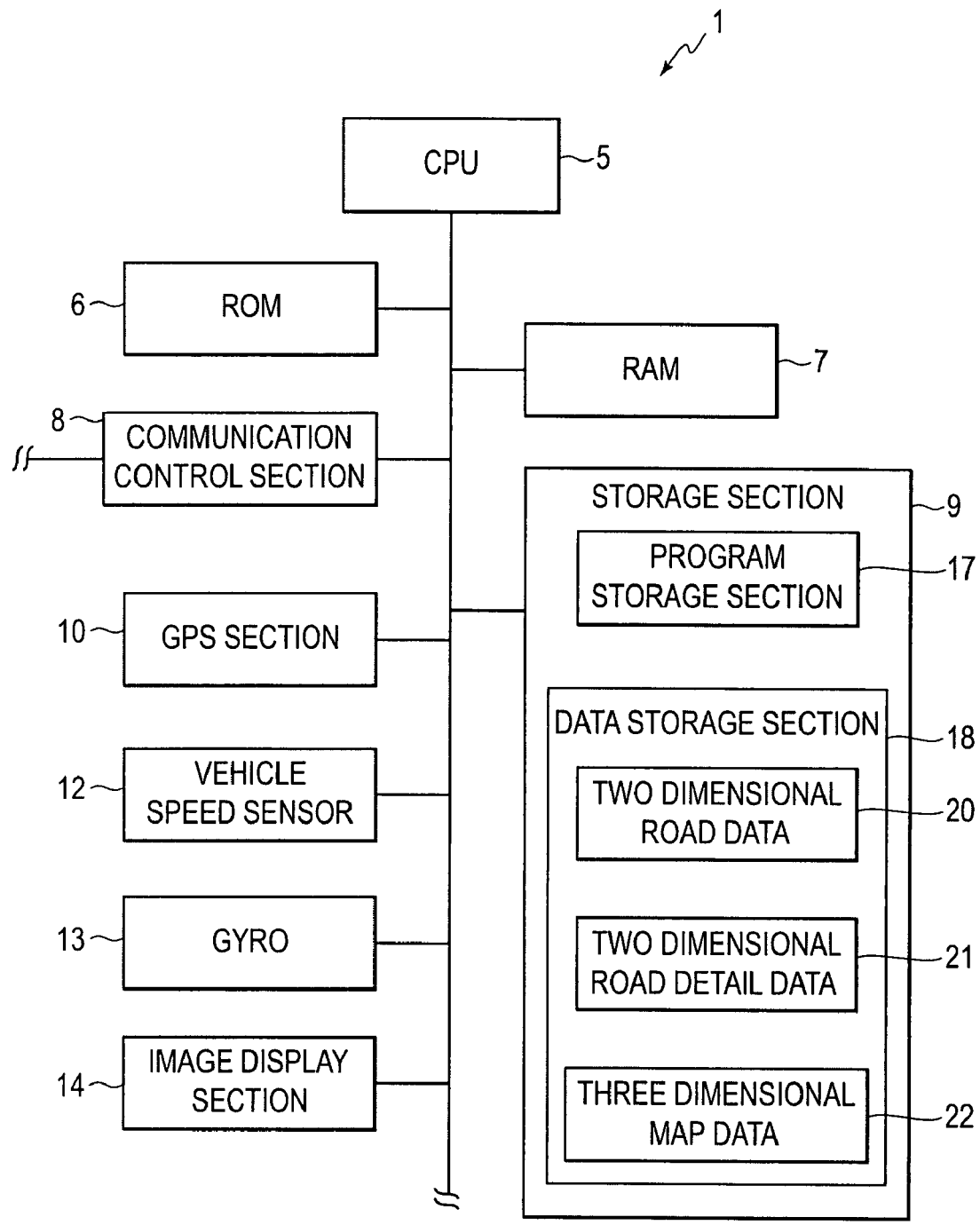
FIG. 2 is a diagram illustrating an exemplary navigation apparatus.

FIG. 2 is a diagram illustrating an example of hardware configuration of navigation apparatus. Navigation apparatus 1 may include a controller (e.g., CPU 5), a ROM 6, a RAM 7, a communication control section 8, a storage section 9, GPS section 10, a vehicle speed sensor 12, gyro 13, an image display section 14, and so forth, and these sections may be connected, and may provide route guidance to a set destination.

The CPU 5 may be a central processing device, and may perform various information processing such as route search, route guidance, and so forth. The CPU 5 may control the navigation apparatus 1 based on programs stored in ROM 6, RAM 7, a storage section 9, and so forth. The ROM 6 may be a read-only memory and may store basic programs, parameters and so forth for operating the navigation apparatus 1. The RAM 7 may be a random access memory enabling writing in/reading out. For example, it may provide a working memory for CPU 5 to perform various information processing. Map data for display may be read in to the RAM 7 from the storage section 9. The communication control section 8 may be a functional section for connecting to a network such as Internet. The Navigation apparatus 1 may communicate with an external server through the communication control section 8.

The storage section 9 may be a storage device with mass-storage medium such as a semiconductor memory, a hard disk, an optical disk, a magneto optical disk and so forth, and may form a program storage section 17 and a data storage section 18. The program storage section 17 may store an OS (Operating System), i.e., a basic program for operating the navigation apparatus 1, a route guidance program for CPU 5 to perform a route guidance processing, and so forth.

The data storage section 18 may store map data made up of two-dimensional road data 20, two-dimensional road detail data 21, 3D map data 22, and so forth. Two-dimensional road data 20 may be map data displaying a road network with links that are connecting nodes. Two-dimensional road data 20 may be used, for example, for CPU 5 to search for a route from a departing point to a destination.

The two-dimensional road detail data 21 may be the map data for CPU 5 to display a two-dimensional map on an image display section 14. The two-dimensional road detail data 21 may include information of road traffic lanes or information relating to various facilities such as restaurants, gas stations, schools, factories, and so forth. Accordingly, it may be possible to provide detailed geographic information to the driver. The 3D map data 22 may be 3D city map data displaying a city with 3D computer graphics using 3D map data that defines 3D information on structures. The term "structure" here refers to all displayed elements such as, for example, roads, railroads, buildings, ground and so forth, and each structure may be given an attribute indicating an element classification of the structure such as "road," "railroad," "building," and/or "ground."

The GPS section 10 may receive GPS signal sent by an orbiting GPS satellite and provide it to CPU 5. The vehicle speed sensor 12 may be a sensor for detecting the speed of vehicle. The Gyro 13 may be a sensor for detecting the angular velocity of vehicle.

With the GPS signal, the vehicle speed, the angular velocity and/or so forth, the CPU 5 may calculate the driving condition of vehicle such as latitude and longitude of the current location, the traveling direction, the speed, the acceleration, and/or so forth.

The image display section 14 may include, for example, an LCD, plasma display, or other display devices, and may display the guidance screen that CPU 5 creates with two-dimensional road detail data 21, 3D map data 22, and so forth. The image display section 14 may also have a touch panel function so that the driver may set a destination or other information in the navigation apparatus 1 by touching a menu shown on the display monitor. Thus, the image display section 14 may function as destination set receiving means for receiving a setting of a destination. Note that, although not shown, the navigation apparatus 1 may include an audio output function so that it may provide route guidance with audio beside with the guidance screen.

Figure 3:
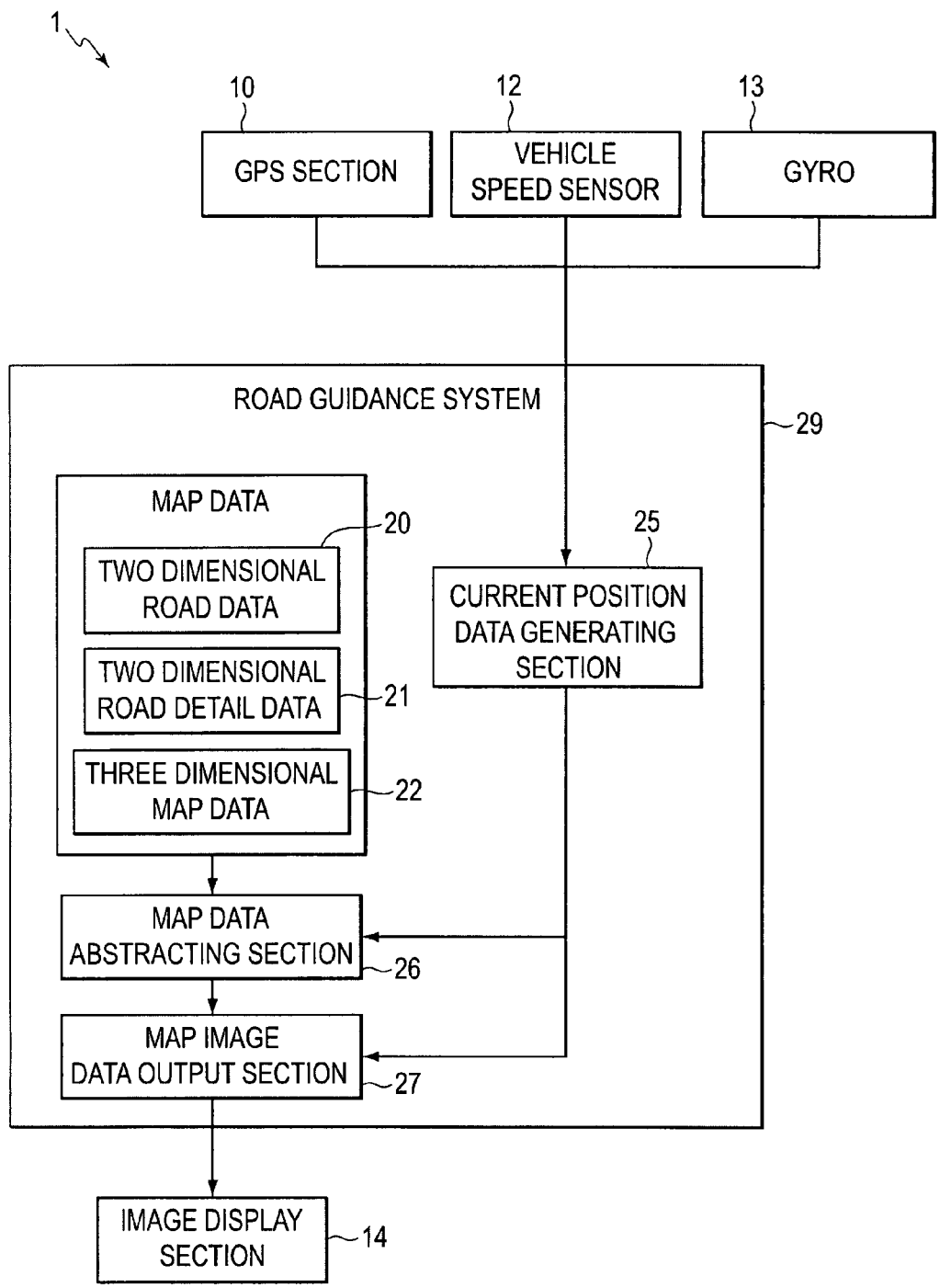
FIG. 3 is a diagram illustrating an exemplary road guidance system.

FIG. 3 is a diagram illustrating an example of the system configuration of a road guidance system. The road guidance system 29 may be formed when CPU 5 performs the route guidance program stored in the program storage section 17. The current location data generating section 25 may generate current location data of a vehicle on the basis of the GPS signal from GPS section 10, detected speed from the vehicle speed sensor 12, the gyro 13 and so forth. The current location data may include information presenting the driving condition of vehicle such as latitude and longitude of the current location, the traveling direction, the speed, the acceleration, and/or so forth.

The map data extracting section 26 may receive the current location data from the current location data generating section 25 and may extracts map data from two-dimensional road detail data 21 and 3D map data 22 to provide guidance at the current location. As described later, regarding 3D map data 22, the map data extracting section 26 may set a region for which data is to be read along the route and may extract structures located within the region for which data is to be read, from among the structures in 3D map data 22.

The map image data output section 27 may generate map image data for guidance with two-dimensional road detail data and 3D map data extracted by the map data extracting section 26 and may output the image on the image display section 14. The map image data output section 27 may obtain current location data from the current location data generating section 25 and may display the current driving location of the vehicle, the traveling direction, and so forth with a moving two-dimensional image and/or a moving 3D image on the basis of this data.

Regarding the moving 3D image, the map image data output section 27 may set a viewpoint on the basis of the current location acquired by the current location data generating section 25, and may calculate the two-dimensional image data which is for drawing the scene from this viewpoint in perspective by means of 3D map data. Then the map image data output section 27 may create two-dimensional image data in real time in accordance with the motion of the viewpoint. By displaying the series of the created data sequentially on the image display section 14, a moving 3D image may be displayed on the image display section 14. Thus, the map image data output section 27 may function as a moving 3D image generator for generating a moving 3D image viewed from predetermined viewpoint on the basis of 3D map data 22.

Note that the terms "movie," "moving image," and "motion-image" described herein contemplate a picture shifts smoothly or still images which are displayed at predetermined intervals so that driver may recognize their consecutive relation. When displaying moving images, the smoother the movie displayed, the more processing ability or memory of CPU 5 is consumed. Therefore, presenting a moving image by using consecutive still images may decrease the load of the navigation apparatus 1. Each still images consecutively displayed may be a still image in which the viewpoint moves in accordance with the movement of current location. A relative position of viewpoint with respect to the traveling vehicle may be identical; however, the relative position may change in accordance with the movement of current location.

Figure 4:
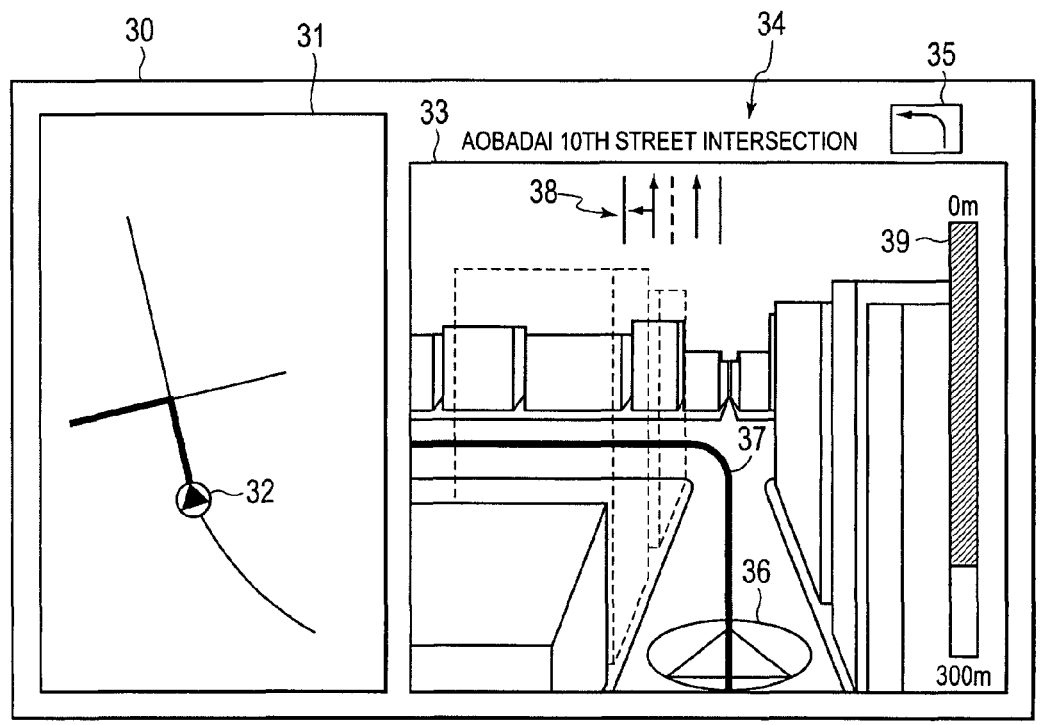
FIG. 4 is a diagram illustrating an exemplary guidance screen in the navigation apparatus.

FIG. 4 is a diagram illustrating an example of a guidance screen displayed on the image display section 14. The guidance screen 30 may include a two-dimensional map screen 31 and a 3D map screen 33. The two-dimensional map screen 31 may be drawn with two-dimensional road detail data 21, and the 3D map screen 33 is drawn with 3D map data 22. Note that the guidance screen may have various display modes. Therefore, it may be possible to display a two-dimensional map screen 31 on a full screen or the enlarged two-dimensional map at the position of the 3D map screen 33.

On the two-dimensional map screen 31, the current location and the traveling direction of vehicle may be displayed as self-vehicle icon 32 on the two-dimensional map. On the 3D map screen 33, the movie presenting a visible scene from a vehicle perspective may be displayed by 3D computer graphics. The direction and/or location of viewpoint may be adjustable. For example, it may generally face the traveling direction of the vehicle. In addition, the viewpoint may be set above vehicle, and current position and traveling direction of vehicle may be displayed as self-vehicle icon 36.

On the 3D map screen 33, a route 37 and/or traffic lane information 38 may be displayed. By following 3D map screen 33, a driver may change a course or change a lane. In addition, on the 3D map screen 33, a distance indicator 39 may be displayed indicating the remaining distance to the guidance intersection that gives guidance of a course change. The maximum distance to guidance intersection (300 m in FIG.) and the remaining distance to guidance intersection (corresponding to the length of the bar) may be displayed. Additionally, at the top of the 3D map screen 33, the name of the intersection 34 and an arrow 35 representing a turning direction may be displayed.

The navigation apparatus 1 may normally display the two-dimensional map screen 31 on the full guidance screen 30. When vehicle approaches a guidance intersection, it may begin to display the 3D map screen 33. The 3D map screen 33 may keep being displayed until the vehicle passes through the guidance intersection. This moving 3D image for route guidance may be called a cut-in movie.

Cut-in movie is one kind of enlarged images of intersection, and driver may arrange it to be displayed or not displayed. The cut-in movie may displayed while vehicle drives on general roads, and the conventional guidance with the two-dimensional map screen 31 may be provided when driving on expressways. The resolution of cut-in movie on the screen may be, for example, 512×480 dots (width×height) on VGA (Video Graphics Array).

With reference to FIGS. 5-9, an example of generating cut-in movie in navigation apparatus will be explained. This function may be performed by the map data extracting section 26.

Figure 5:
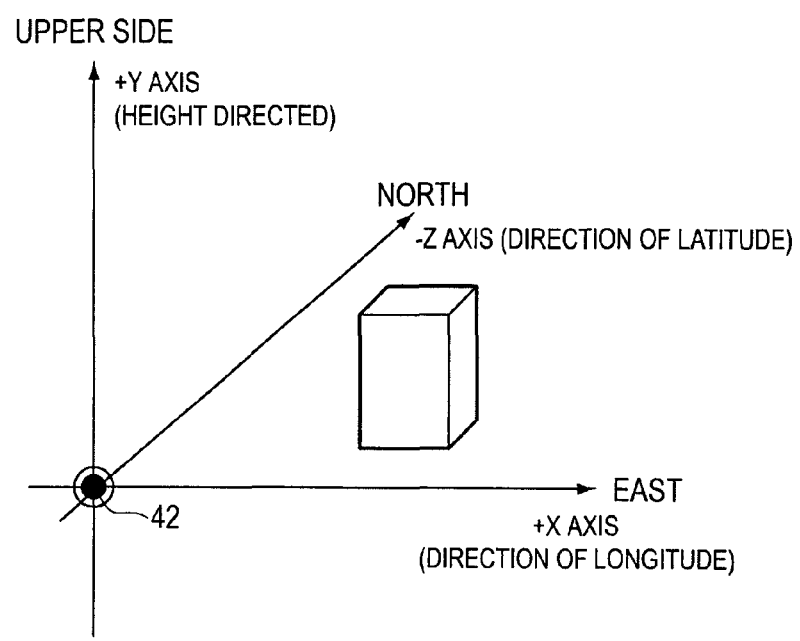
FIG. 5 is a diagram illustrating an exemplary coordinate system.

FIG. 5 is a diagram illustrating a coordinate system that may be used in the navigation apparatus 1. The navigation apparatus 1 may sets a drawing reference point 42 as origin of coordinate and sets a longitude direction along an X-axis in a positive and easterly direction. It may also set a latitude direction along a Z-axis in a negative and northerly direction and a height direction along a Y-axis in a positive and upward direction. The drawing reference point 42 is a reference point for the map data extracting section 26 to set a region for which data is to be read, and it may be a specified point on the route. Thus, the navigation apparatus 1 may set a reference point at a specified point on route.

In particular, a point within an intersection on the route may be set as the specified point (drawing reference point). More specifically, a center point in an intersection, an intersection node, a closest complement point to an intersection node or a center point of intersection (in case of 3D network data), a center point of a region where an entrance lane to an intersection and a departing lane from an intersection are crossing, and/or so forth. Further, when a specified point is set at any point but intersections on the route, for example, on a curve, a specified point (a drawing reference point) may be set at a center point of the curve, at a point with largest curvature, on a common node for two adjacent links on a curve which angle between the two links is the smallest, and so forth.

A method of setting a drawing reference point will be described with reference to FIG. 6. The navigation apparatus 1 may sets a drawing reference point in an intersection guidance area 44 of a guidance intersection. The guidance intersection described here is an intersection where guidance is given by cut-in movie, such as an intersection where guidance route makes a right or left turn, a complicated intersection such as three-road intersection or five-road intersection, and/or so forth. Guidance intersections may be determined along a route based on their qualities. For example, a condition that an intersection making turns or the like may be preset so that navigation apparatus 1 may detect the intersections fulfilling the search condition for guidance intersection. Alternatively, it may be possible to specify an attribute for each intersection to determine whether guidance should be given or not.

Generally, the navigation apparatus 1 sets a route on links 43 and sets a drawing reference point 47 on a node. A drawing reference point 47 may also be determined, for example, at a point other than a node, such as by setting a center point of an intersection guidance area 44 as the drawing reference point 47. When adjusting a view position in accordance with turns at a guidance intersection in order to provide better visibility of a route in a cut-in movie, the navigation apparatus 1 may use the drawing reference point 47 as a viewpoint adjusting reference point.

Note that a route may occasionally be determined by means of more detailed road map data (called 3D network data) such as traffic lane data, and so forth. When a route is assigned on a node, it is set on the center of road, however, when using detail road map data, a route may be set on a specific traffic lane instead of the node. Detail road map data may provide complement points for drawing a leading curving line during the turn. In the case of assigning a route with these detail road map data, navigation apparatus 1 may determine a closest complement point to a node to serve as a drawing reference point. Further, navigation apparatus 1 may set a viewpoint adjusting reference point at a point where a route enters an intersection guidance area 44. An arrangement may also possible to display a guidance line on the left side of road by displaying a route on the left of the centerline of the road.

Figure 6:
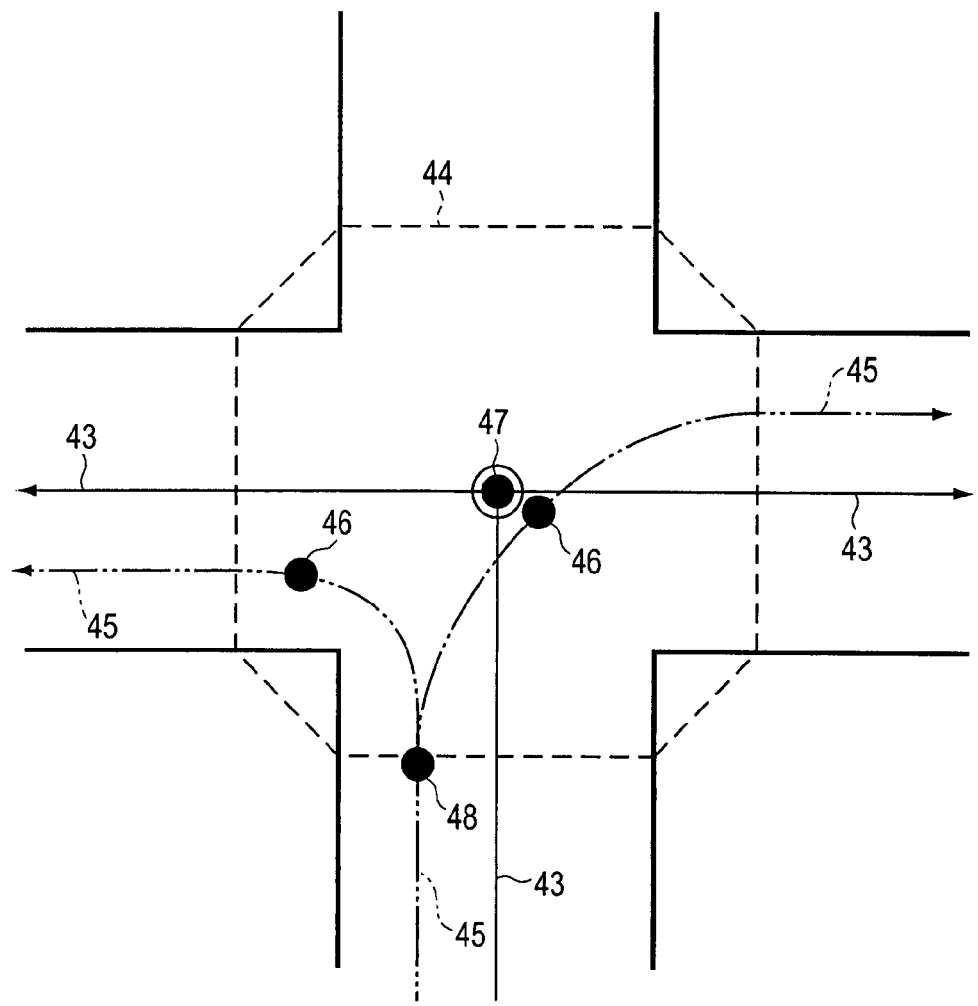
FIG. 6 is a diagram illustrating an exemplary method of setting drawing a reference point.

In the example of FIG. 6, one or more drawing reference points 46 may be set at complement points on the route 45. Note that in this diagram, a drawing reference point 46 is shown for two possible routes 45, one having a right-turn and one having a left-turn. The point where the route 45 enters the intersection guidance area 44 may be set as a viewpoint adjusting reference point 48. Note that, when a distance from a point entering intersection guidance area 44 to a drawing reference point 46 is greater than a predetermined distance (e.g., greater than 40 m), an arrangement may be made to set a point which is the intersection guidance area 44 and a predetermined distance away from a drawing reference point 46 as a viewpoint adjusting reference point.

Figure 7A:
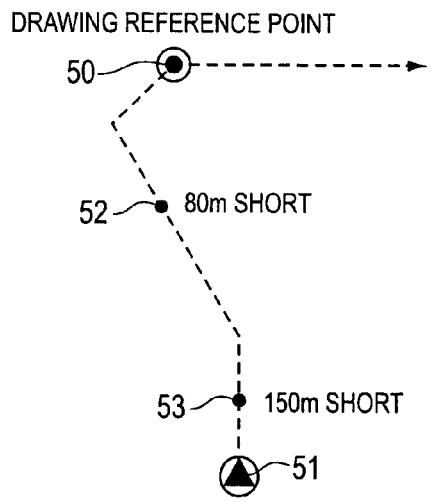
FIGS. 7A-7C are diagrams illustrating an exemplary method for setting a region for which data is to be read.

Next, a method of setting a region for which data is to be read will be described with reference to FIGS. 7A-7C. First, as shown in FIG. 7A, navigation apparatus 1 may set a first point 52 and a second point 53 before a drawing reference point 50 (also serving as an origin of coordinate) in front of a self-vehicle 51 on the route displayed with dotted line. The first point 52 may be a first distance (herein 80 m) away from a drawing reference point 50 along the route, and the second point 53 may be a point that is a second distance (herein 150 m) away from a drawing reference point 50 along route. The second distance is greater than the first distance. Note that first distance and second distance are set as the distance along route here; however, they may be alternatively set as straight line distance from the drawing reference point 50.

Alternatively, a first point and a second point can be respectively determined at a node located in a vicinity of the first distance and a node located in a vicinity of the second distance (e.g., a node which is shortest distance, or a note which is shortest distance from the first distance and the second distance in opposite direction from a drawing reference point) by means of two-dimensional road data 20. In this case, a node located about 80 m away from a drawing reference point 50 may be set as a first point, and a node located about 150 m away from a drawing reference point 50 may be set as a second point. If the route is curved at a node, a node which is adjacent the first point may be the second point.

As described below, navigation apparatus 1 may set a region for which data is to be read based on a straight line connecting a first point and a second point along the route. Therefore, navigation apparatus 1 may set a region for which data is to be read along route that is likely to be in the driver's field of view. Therefore, setting a region for which data is to be read in accordance with the shape of the route (e.g., points on the route) may reduce or avoid the reading of 3D map data of a region that is outside the driver's field of view, and thus unnecessary.

As another alternative, for example, a first point may be set and the region for which data is to be read based on a line that passes through the first point and is alongside the link. Thus, navigation apparatus 1 includes point setting means for setting at least one point on the route.

Figure 7B:
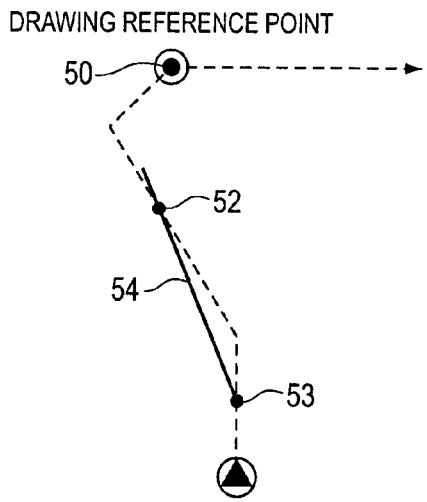

Next, as shown in FIG. 7B, the navigation apparatus 1 may set a line 54 having end-points that are the first point 52 and the second point 53. Then, navigation apparatus 1 may extend the side of first point 52 on line 54 up to a predetermined length (herein 10 m).

Figure 7C:
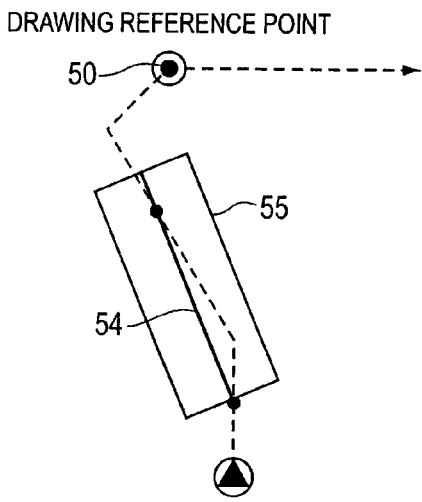

Next, as shown in FIG. 7C, navigation apparatus 1 may form a quadrangle 55 having the extended line 54 as a centerline and having a predetermined width (herein 30 m) on each left and right side from the centerline 54. This quadrangle 55 may be sets as a region for which data is to be read.

Returning to FIG. 7B, extending the centerline 54 predetermined length in traveling direction of vehicle is useful to avoid any missing parts in 3D map data to read in, by overlapping a region for which data is to be read that will be formed ahead of this region for which data is to be read (not shown) with the region for which data is to be read 55. By setting a region for which data is to be read as described, 3D map data may be extracted along route without any missing parts.

Thus, navigation apparatus 1 may set a region along the route based on points (first point and second point) as specified above. This region may be set as a rectangle (herein oblong) formed with this first and second point, and the straight centerline passing through this first and second point. Further, the edge of the rectangle at the side of the first point (furthest in traveling direction of the vehicle) may be extended a predetermined distance away from the first point by extending the centerline in the traveling direction of vehicle.

FIG. 8 is a diagram of an exemplary region for which data is to be read that navigation apparatus 1 may sets for a guidance intersection. In order to obtain as similar shape of a region for which data is to be read as the shape of route possible, the navigation apparatus 1 may set a total of four regions for which data is to be read including regions 61, 65, 68, in addition to 55, described above.

In order to set the region 61 for which data is to be read, navigation apparatus 1 may set a first point 62 at 10 m short of a drawing reference point 50 along route and may use point 52 as a second point. The navigation apparatus 1 may form a rectangle that has 30 m on each left/right side, and may sets this rectangle as the region 61 for which data is to be read. The edge of the region 61 may be located at 30 m extended point of centerline from the first point 62 in the traveling direction.

The reason for increasing the extension of centerline of the region 61 more than the region 55 is that the edge of the region 61 in the traveling direction is located nearby a guidance intersection. Because the traveling direction of vehicle will likely shift in a guidance intersection, the increased overlaps of region 61 with regions 65 and 67 can prevent any interruption or lack of 3D map data in a guidance intersection in the cut-in movie. That is to say, in order to read in 3D map data of the area displayed on a guidance screen even in a guidance intersection with significant level of turn, an arrangement is made to set a region for which data is to be read relatively large.

The region 65 may be a rectangular region based on a centerline which passes through the drawing reference point 50 serving as a first point and the point 62 serving as a second point, and which has 30 m on each left/right side. The centerline may be extended 150 m from the drawing reference point 50. Because when entering an intersection, the scene directly ahead of the vehicle will be in good view, navigation apparatus 1 sets a relatively large region for which data is to be read in a direction extending in the viewing direction. Thus, when a first point is located in an intersection, the navigation apparatus 1 may set greater predetermined distance (length of extension) to extend the edge of the region on the side of a first point, than other regions.

Regarding region 68, the navigation apparatus 1 may set the drawing reference point 50 as a first point, set a point 67, which is 50 m away from the drawing reference point 50 along the route as a second point, and set a rectangular region with a centerline passing through a first point and a second point as the region 68. The left/right width from a centerline may be 30 m each. The navigation apparatus 1 may quits cut-in movie after a vehicle completes a turn at a guidance intersection. Therefore, it may not be necessary to extend the center line of the region 68, which is for drawing a scene after turning. Thus, without unnecessary extension of centerline of the region 68, the amount 3D map data that must be read is decreased, and consequently the amount of memory consumption may be reduced.

Next, a method of determining structure within a region for which data is to be read will be described with reference to FIG. 9. The structures that are determined to be located within a region for which data is to be read may be extracted from 3D data 22. Navigation apparatus 1 (e.g., via map data extracting section 26) may forms a rectangle (e.g., 72, 73, 74) with vertexes of a smallest and a biggest X coordinate and Z coordinate of the structure on the X-Z plane. If at least a part of this rectangle is located within a region for which data is to be read (e.g., region 71), navigation apparatus 1 determines the structure is located within the region for which data is to be read. If the region of the rectangle is not at all located within the region for which data is to be read, it may be determined that the structure is not located within the region for which data is to be read.

Figure 9:
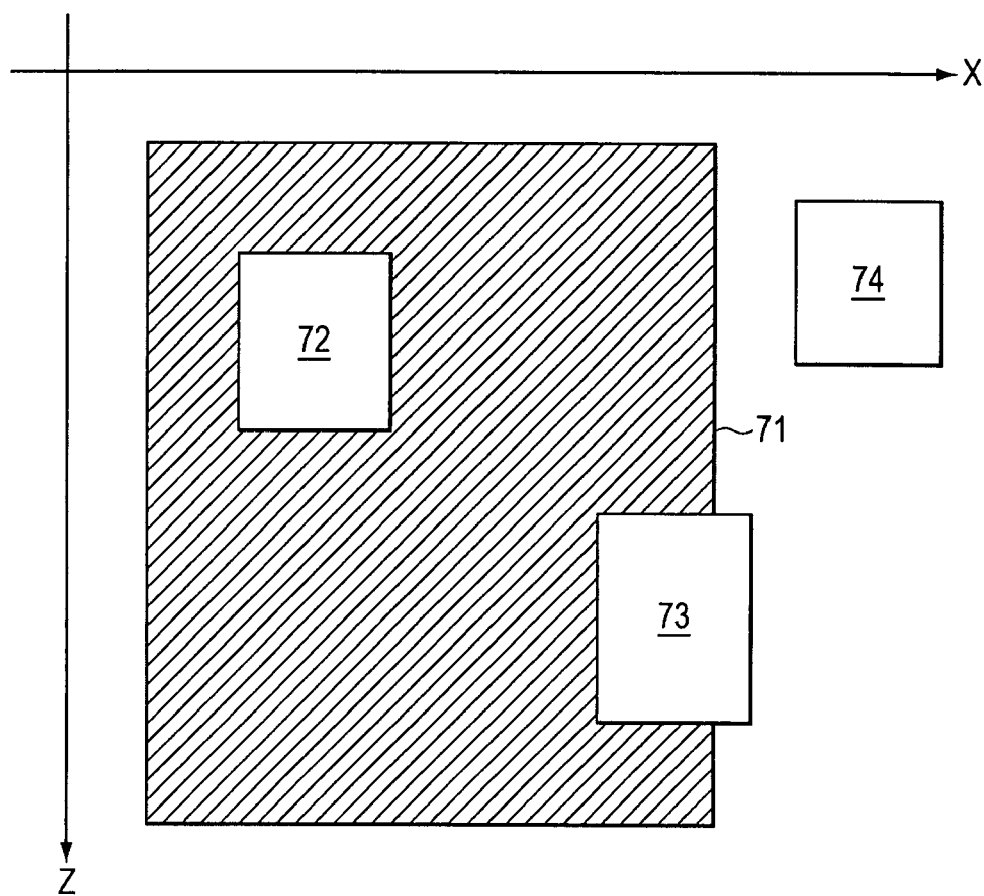
FIG. 9 is a diagram illustrating an exemplary method of determining structures within the region for which data is to be read.

According to the specific example shown in FIG. 9, a rectangle 72 is entirely located within a region 71 for which data is to be read. Also, a rectangle 73 is partially located within region 71. Therefore, the structures corresponding to rectangles 72 and 73 may become a subject for extraction. On the other hand, a rectangle 74 is not at all located within region 71 at all. Therefore, the structure(s) corresponding to the rectangle 74 may not become a subject for extraction. The navigation apparatus 1 may thus determine whether structures which may be displayed with 3D map data are located within a region for which data is to be read, and if they are located in a region for which for which data is to be read, the 3D map data may be read out.

In addition to the above described methods, other conditions may be used to reduce the amount of memory consumption by further eliminating 3D map data to be read. For example, regarding structures whose element classification is other than road, it may be possible to avoid reading 3D data for small structures, which may not be important for recognizing an area. For example, structures that fit within a sphere having diameter of a predetermined length (100 m, for example) and at least a part of the sphere is located within the region for which data is to be read, the structures fitting within the sphere may not be read. Thus, the amount of memory consumption may be decreased. "Element classification" here refers to a classification of structure such as road, railroad, building, and so forth, and it may be associated with given to structures as an attribute. Thus, it may also be possible to reduce the 3D data read for the cut-in movie by not reading data for structures having one or more specified element classifications.

Next, with reference to a flowchart in FIG. 10, an exemplary road guidance method will be described. The method may be implemented, for example, by CPU 5 executing a road guidance program.

Figure 10:
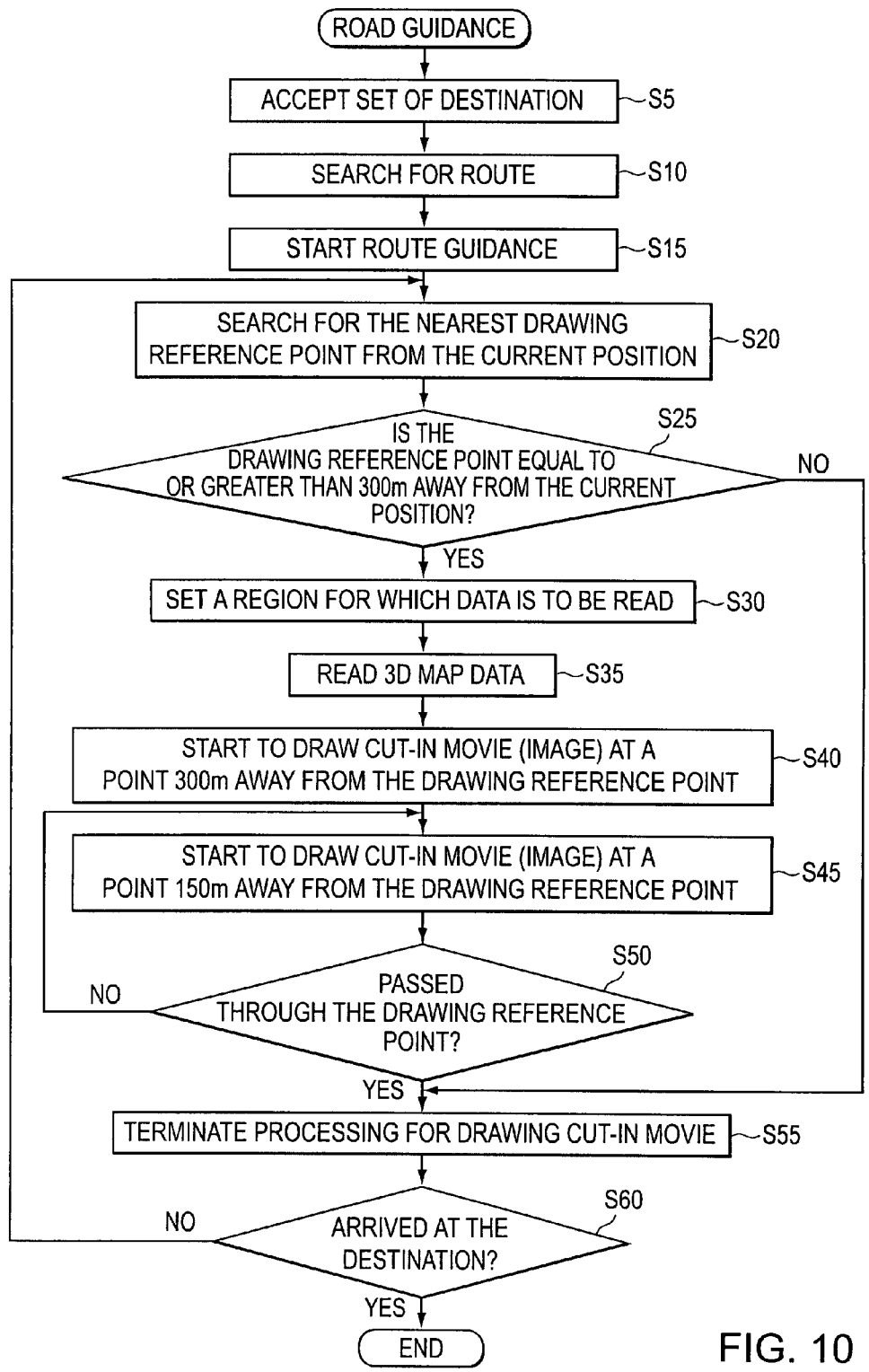
FIG. 10 is a flowchart illustrating an exemplary method of providing route guidance.

As shown in FIG. 10, first, navigation apparatus 1 receives a destination setting, e.g., input by a driver (Step 5). Next, the navigation apparatus 1 performs a route search to the destination by means of two-dimensional road data 20 (Step 10), and starts providing guidance on a guidance screen (Step 15).

Then, navigation apparatus 1 sets a drawing reference point on, for example, a node in a guidance intersection on the route. All the drawing reference points over the entire route may be set in advance, or a predetermined number of drawing reference points which are closest to a current location may be set and other drawing reference points may be set sequentially in accordance with the modem of the vehicle.

Next, the navigation apparatus 1 searches for a closest drawing reference point from current location (Step 20), and determines whether this drawing reference point is 300 m or more away from the current location (Step 25), e.g., to ensure there is enough time for generating and displaying a cut-in movie. The distance may be longer or shorter than 300 m, according to, for example, the information processing capability of the navigation apparatus 1 and the speed of vehicle.

In the case that the distance from current location to a drawing reference point is less than 300 m (Step 25=No), the navigation apparatus 1 terminates drawing processing of cut-in movie relating to this drawing reference point (Step 55). In this case, navigation apparatus 1 may display a two-dimensional enlarged image of guidance intersection instead of cut-in movie.

If the distance from current location to a drawing reference point is more than 300 m (Step 25=Yes), the navigation apparatus 1 defines a region for which data is to be read based on this drawing reference point (Step 30). Navigation apparatus 1 then reads in the structures in the region for which data is to be read (set in Step 30) among all the structures in 3D map data (Step 35).

Next, when the current location of vehicle reaches a point of 300 m away from a drawing reference point, the navigation apparatus 1 generates a still image as part of the 3D movie of the viewpoint located 150 m before a drawing reference point, and displays it as a cut-in movie (Step 40). This is still image may notify a driver that a cut-in movie will be displayed, and in a mean time, for performing a process of displaying 3D movie while the sill picture is displayed. Then when current location of vehicle reaches the point of 150 m away from a drawing reference point, navigation apparatus 1 switches the still image to the movie, and displays a moving 3D image in real time (Step 45).

Next, navigation apparatus 1 judges whether current location has passed a drawing reference point (Step 50), and in the case of not having passed through (Step 50=No), it continues drawing cut-in movie. When having passed the drawing reference point (Step 50=Yes), navigation apparatus 1 may terminate drawing cut-in movie (Step 55). However, for example, the cut-in movie may also be terminated when the vehicle goes off the route or when the vehicle has traveled predetermined distance beyond the drawing reference point along the route.

Then, navigation apparatus 1 judges whether current location has reached a destination (Step 60). If the destination is not reached (Step 60=No), operation of the method returns to Step 20 and performs a drawing processing of cut-in movie for next drawing reference point. If the current location has reached the destination (Step 60=Yes), navigation apparatus 1 terminates road guidance. Thus, in the present example 1, by setting region for which data is to be read limitedly along the route, the amount of 3D map data read in for example, RAM 7 (FIG. 2) may be reduced, and consequently, this may decrease the memory consumption.

Figure 11:
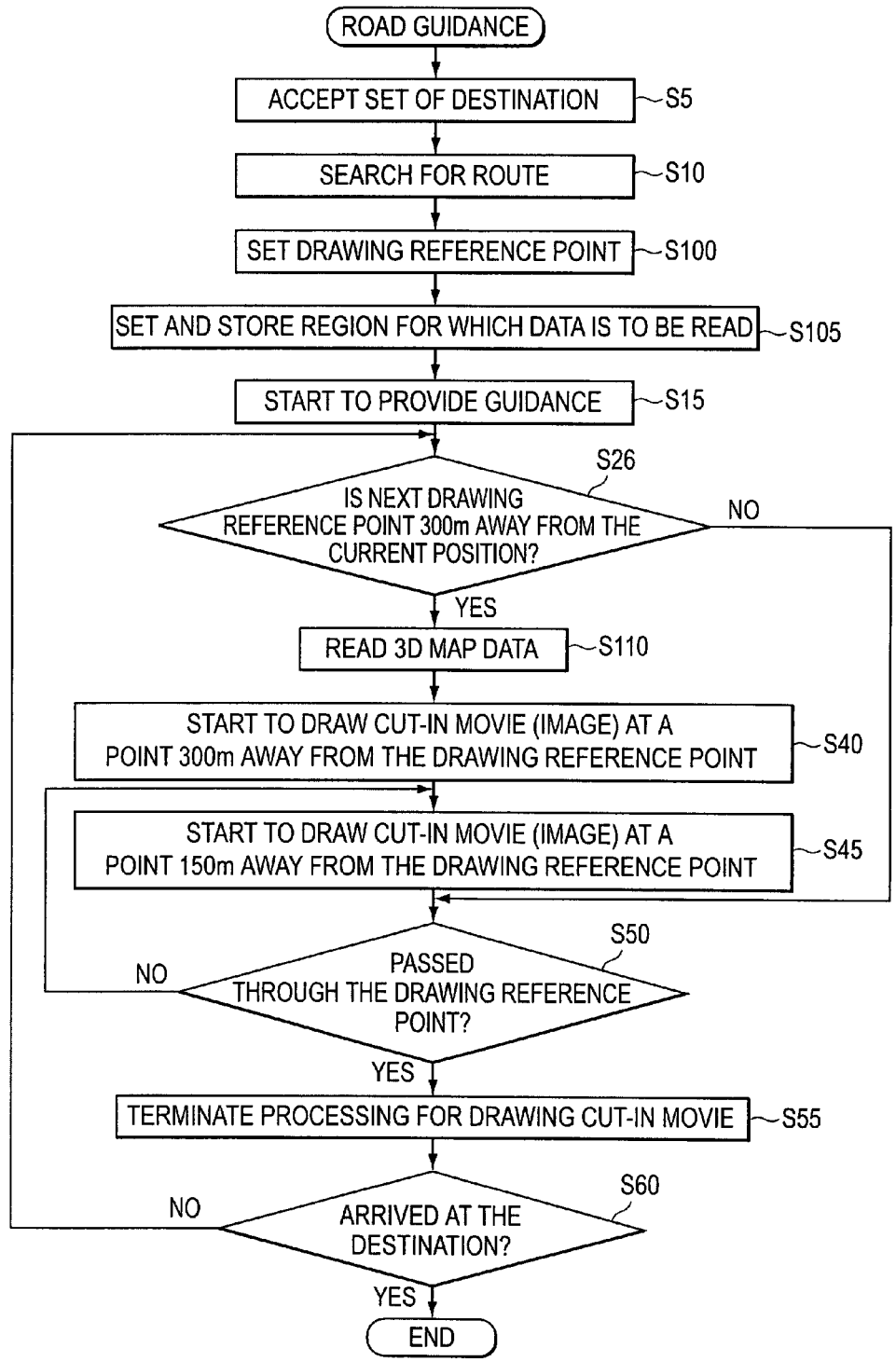
FIG. 11 is a flowchart illustrating an exemplary method of providing route guidance.
Figure 12:
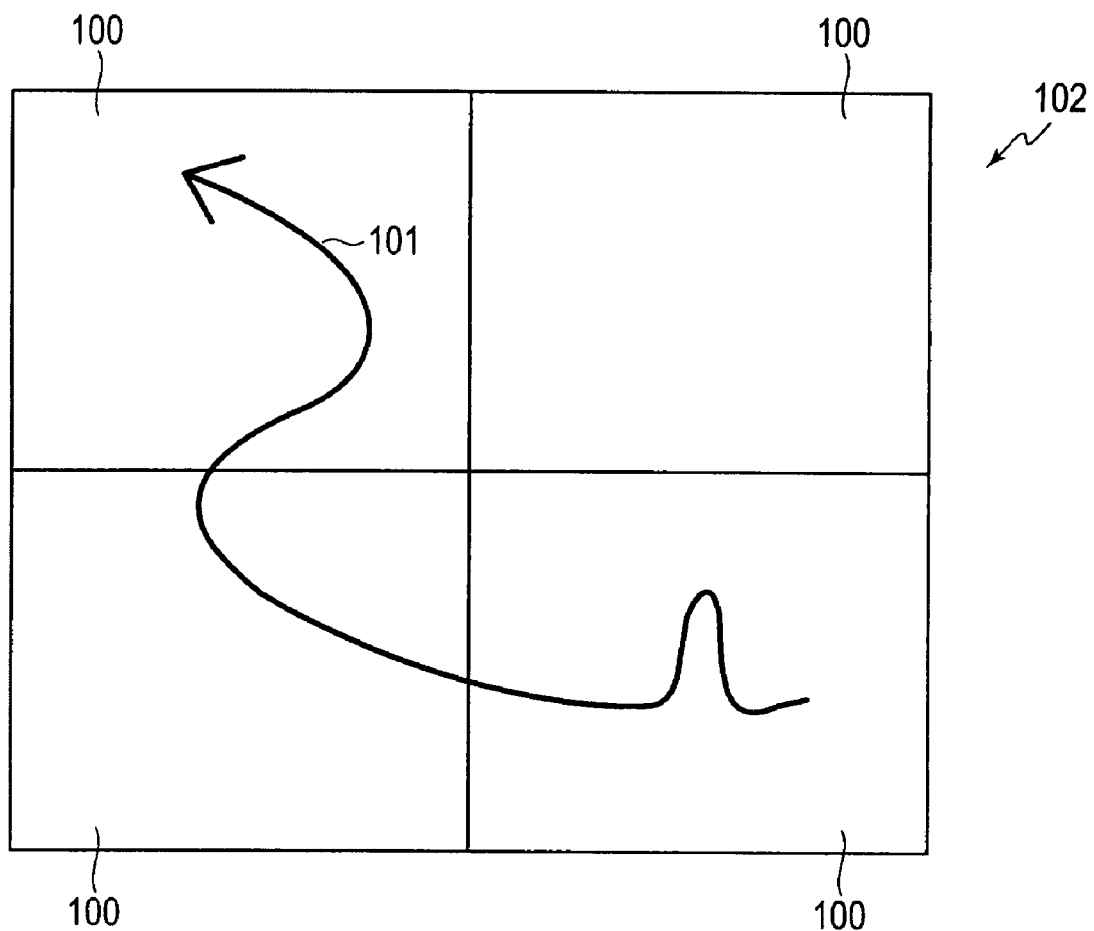
FIG. 12 is a diagram showing a conventional navigation apparatus/method.

In the examples above, the navigation apparatus 1 may sequentially set regions for which data is to be read in accordance with the traveling of vehicle. However, the regions for which data is to be read throughout the route may be set and stored at the start of driving, and read them out in accordance with traveling. Because regions for which data is to be read are set beforehand, when guidance starts, more of the resources of CPU 5 may be dedicated displaying cut-in movies during traveling. A procedure of this case will be described with reference to a flowchart in FIG. 11. Note that the same processing as FIG. 10 will be given with the same reference numeral, and the description will be simplified.

As shown in FIG. 1, first, navigation apparatus 1 receives a destination setting, e.g., input by a driver (Step 5), and performs a route search for destination (Step 10). Next, navigation apparatus 1 sets all the drawing reference points throughout the route (Step 100). Then, navigation apparatus 1 sets the region for which data is to be read for each preset drawing reference point, and stores them in a memory such as RAM 7 (FIG.2) or the like (Step 105). Then, navigation apparatus 1 starts providing guidance on the guidance screen (Step 15).

Next, navigation apparatus 1 determines whether the next drawing reference point (the first reference point if immediate after the departure) is more than 300 m away from current location (Step 26). In the event that the distance to next drawing reference point is less than 300 m (Step 26=No), navigation apparatus 1 terminates the drawing process of cut-in movie for this drawing reference point (Step 55). In the event that the distance to next drawing reference point is more than 300 m (Step 26=Yes), navigation apparatus 1 reads out the region for which data is to be read corresponding to this drawing reference point stored in memory, and reads in the 3D map data in this region for which data is to be read among the 3D map data 22 (Step 110). The rest of the process may be the same as the process in the flowchart in FIG. 10.

A guidance procedure with cut-in movie has been described above, but it is possible to give more detailed conditions for display of cut-in movie. For example, in the case that the distance to an adjacent guidance intersection is more than 150 m and less than 300 m, an arrangement may be made for navigation apparatus 1 to display the guidance image of the next guidance intersection immediately after passing the first guidance intersection. In this case, when navigation apparatus 1 successfully draws the cut-in movie at the first intersection, it may provide guidance with two-dimensional enlarged image at the next guidance intersection. When it does not draw cut-in movie at the first guidance intersection, it provides guidance with cut-in movie at the next guidance intersection.

If the distance to an adjacent guidance intersections is less than 150 m, the navigation apparatus 1 may provides guidance with a two-dimensional enlarged image at the next intersection, despite the fact that the guidance provided at the first guidance intersection was with cut-in movie or two-dimensional enlarged image. Additionally, at rotaries (also called roundabout intersections) or side roads, the navigation apparatus 1 may provide guidance in the same way as a conventional navigation apparatus.

Various conditions for drawing cut-in movie have been explained above. However, these are for providing as much guidance with cut-in movie as possible within the limits of an information processing capability of navigation apparatus 1. In case that information processing capability of navigation apparatus 1 is sufficient, guidance with cut-in movie may be performed at every guidance intersection, despite of the distance between current location and drawing reference point.

Hereinafter, advantages that may be obtained according to one or more of the above described examples will be described.

The above described setting of a region for which data is to be read along the route may decrease the amount of the 3D map data to read in the memory. The above described setting of a region for which data is to be read along the route may make it is possible to determine whether any structure is located within a region for which data is to be read and to prevent reading in unnecessary structure.

According to one or more of the above examples, it is possible to determine whether to draw a cut-in movie on the basis of the distance between current location and drawing reference point, so that the cut-in movie may be drawn within information processing capability of CPU 5.

What is claimed is:

1. A navigation apparatus for guiding a vehicle along a driving route, comprising:
    a memory that stores 3D map data; and
    a controller that:
        sets a reference point on a route;
        sets a first point which is a first distance away from the reference point and a second point which is a second distance away from the reference point;
        sets a rectangular region along the route, the center line of the region passing through the first point and the second point, a side of the rectangular region closest to the first point being a predetermined distance beyond the first point in a travel direction of the vehicle;
        obtains 3D map data corresponding to the region;
        generates a 3D movie which has a predetermined viewpoint on the basis of the obtained 3D map data; and
        displays the generated 3D movie;
    wherein when the first point is set at an intersection, the controller sets a longer distance between the side of the region closest to the first point and the first point than a distance that would be set between the side of the region closest to the first point and the first point if the first point were not set at an intersection.

2. The navigation apparatus according to claim 1, wherein the controller:
    determines whether any structures represented by the 3D map data are located within the region; and
    obtains the 3D map data representing the structures which were determined to be located within the region.

3. The navigation apparatus according to claim 1, wherein:
    the route is made up of route data including nodes and links, each link connecting two adjacent nodes; and
    the first point and the second point are each set on one of the nodes.

4. The navigation apparatus according to claim 1, wherein:
    the memory stores data corresponding to a plurality of the regions that are set along the searched route by the controller; and
    the controller:
        sets the destination;
        searches for the route to the destination;
        obtains data corresponding to at least one region among the plurality of regions stored in the memory in accordance with the motion of the current position; and
        obtains the 3D map data corresponding to the obtained region.

5. The navigation apparatus according to claim 1, wherein:
    the controller sets at least two of the regions; and
    the at least two regions at least partially overlap.

6. A navigation method for guiding a vehicle along a driving route, comprising:
    setting a reference point on a route;
    setting a first point which is a first distance away from the reference point and a second point which is a second distance away from the reference point;
    setting a rectangular region along the route, the center line of the region passing through the first point and the second point, a side of the rectangular region closest to the first point being a predetermined distance beyond the first point in a travel direction of the vehicle;
    obtaining 3D map data corresponding to the region;
    generating a 3D movie which has a predetermined viewpoint on the basis of the obtained 3D map data;
    displaying the generated 3D movie; and
    when the first point is set at an intersection, setting a longer distance between the side of the region closest to the first point and the first point than a distance that would be set between the side of the region closest to the first point and the first point if the first point were not set at an intersection.

7. The navigation method according to claim 6, further comprising:
    determining whether any structures represented by the 3D map data are located within the region; and
    obtaining the 3D map data representing the structures which were determined to be located within the region.

8. The navigation method according to claim 6, wherein:
    the route is made up of route data including nodes and links, each link connecting two adjacent nodes; and
    the first point and the second point are each set on one of the nodes.

9. The navigation method according to claim 6, further comprising:
    storing data corresponding to a plurality of the regions that are set along the searched route by the controller; and
    setting the destination;
    searching for the route to the destination;
    obtaining data corresponding to at least one region among the plurality of regions stored in the memory in accordance with the motion of the current position; and obtaining the 3D map data corresponding to the obtained region.

10. The navigation method according to claim 6, further comprising:

setting at least two of the regions; wherein the at least two regions at least partially overlap.

11. A non-transitory computer-readable storage medium storing a computer-executable program usable to guide a vehicle along a driving route, the program comprising:

instructions for setting a reference point on a route;

instructions for setting a first point which is a first distance away from the reference point and a second point which is a second distance away from the reference point;

instructions for setting a rectangular region along the route, the center line of the region passing through the first point and the second point, a side of the rectangular region closest to the first point being a predetermined distance beyond the first point in a travel direction of the vehicle;

instructions for obtaining 3D map data corresponding to the region;

instructions for generating a 3D movie which has a predetermined viewpoint on the basis of the obtained 3D map data;

instructions for displaying the generated 3D movie; and instructions for, when the first point is set at an intersection, setting a longer distance between the side of the region closest to the first point and the first point than a distance that would be set between the side of the region closest to the first point and the first point if the first point were not set at an intersection.

12. The navigation apparatus according to claim 1, wherein:

the set rectangular region is a first rectangular region; and the controller:

sets a second rectangular region ahead of the first rectangular region in the travel direction;

sets a third rectangular region ahead of the second rectangular region, the centerline of the third rectangular region being in a viewing direction from the second rectangular region; and gradually extends the center line from the first rectangular region, to the second rectangular region, and to the third rectangular region, as the vehicle travels.

13. The navigation apparatus according to claim 12, wherein the controller:

sets a fourth rectangular region that is after the second rectangular region in the travel direction and is after an intersection for which turning guidance will be given; and does not extend a centerline of the fourth rectangular region.

14. The navigation method according to claim 6, wherein:

the set rectangular region is a first rectangular region; and the method further comprises:

setting a second rectangular region ahead of the first rectangular region in the travel direction;

setting a third rectangular region ahead of the second rectangular region, the centerline of the third rectangular region being in a viewing direction from the second rectangular region; and gradually extending the center line from the first rectangular region, to the second rectangular region, and to the third rectangular region, as the vehicle travels.

15. The navigation method according to claim 14, further comprising:

setting a fourth rectangular region that is after the second rectangular region in the travel direction and is after an intersection for which turning guidance will be given; and not extending a centerline of the fourth rectangular region.

* * * * *